United States Patent [19]

Chakrabarti

[11] 4,178,206
[45] Dec. 11, 1979

[54] METHOD OF FORMING GLASS FIBER DISPERSIONS WITH CATIONIC QUATERNARY AMMONIUM SURFACTANTS HAVING AT LEAST TWO LONG CHAIN GROUPS

[75] Inventor: Paritosh M. Chakrabarti, Wayne, N.J.

[73] Assignee: GAF Corporation, New York, N.Y.

[21] Appl. No.: 876,651

[22] Filed: Feb. 10, 1978

[51] Int. Cl.$^2$ ............................................. D21H 5/18
[52] U.S. Cl. .................................... 162/156; 162/158; 162/182
[58] Field of Search ............... 162/152, 156, 158, 145, 162/182, 183, 184, 186; 65/3 C; 428/378, 401, 375

[56] References Cited

U.S. PATENT DOCUMENTS

| | | | |
|---|---|---|---|
| 3,228,825 | 1/1966 | Waggoner | 162/156 |
| 3,554,863 | 1/1971 | Hervey et al. | 162/158 |
| 3,573,158 | 3/1971 | Pall et al. | 162/156 |
| 3,766,003 | 10/1973 | Schuller et al. | 162/156 |

FOREIGN PATENT DOCUMENTS 838373 2/1975 Belgium .

*Primary Examiner*—S. Leon Bashore
*Assistant Examiner*—Peter Chin
*Attorney, Agent, or Firm*—Walter C. Kehm; Walter Katz

[57] ABSTRACT

In accordance with the present invention, there is provided herein improved glass fiber dispersions for making uniform glass fiber mats by the wet-laid process. The well dispersed glass fiber compositions of this invention usually are prepared by mixing chopped glass fibers in water with a small amount of a select group of cationic quaternary ammonium compounds which have at least two long chain groups as part of the molecule. As features of the invention, the dispersions may be formed at relatively high glass fiber consistencies, in neutral or slightly alkaline solutions, and without generation of a high degree of foams. The resultant dispersions then are used to make very high quality glass fiber mats at high rates of production.

20 Claims, No Drawings

METHOD OF FORMING GLASS FIBER DISPERSIONS WITH CATIONIC QUATERNARY AMMONIUM SURFACTANTS HAVING AT LEAST TWO LONG CHAIN GROUPS

BACKGROUND OF THE INVENTION

1. Field of the Invention

The invention relates to the manufacture of uniform glass fiber mats by the wet-laid process, and more particularly, it is concerned with improved glass fiber dispersion compositions for use in such a process.

2. Description of the Prior Art

High strength, uniform, thin sheets or mats of glass fibers are finding increasing application in the building materials industry, as for example, in asphalt roofing shingles and as backing sheets for vinyl flooring. These glass fiber mats are replacing similar sheets made traditionally of asbestos fibers. Glass fiber mats usually are made commercially by a wet-laid process, which is carried out on modified paper making machinery, as described, for example, in the book by O. A. Battista, *Synthetic Fibers in Papermaking* (Wiley) N.Y. 1964. A number of U.S. patents also provide a rather complete description of the wet-laid process, including U.S. Pat. Nos. 2,906,660; 3,012,929; 3,021,255; 3,050,427; 3,103,461; 3,108,891; 3,228,825; 3,634,054; 3,749,638; 3,760,458; 3,766,003; 3,838,995 and 3,905,067. The German OLS No. 2454354 (Fr. Demande No. 2,250,719), June, 1975, also is pertinent art in this field.

In general, the known wet-laid process for making glass fiber mats comprises first forming an aqueous suspension of short-length glass fibers under agitation in a mixing tank, then feeding the suspension through a moving screen on which the fibers enmesh themselves while the water is separated therefrom. However, unlike natural fibers, such as cellulose or asbestos, glass fibers do not disperse well in water. Actually, when glass fibers, which come as strands or bundles of parallel fibers, are put into water and stirred, they do not form a well-dispersed system. In fact, upon extended agitation, the fibers agglomerate as large clumps which are very difficult to redisperse.

In an attempt to overcome this inherent problem with glass fibers, it has been the practice in the industry to provide suspending aids for the glass fibers, including surfactants, in order to keep the fibers separated from one another in a relatively dispersed state. Such suspending aids usually are materials which increase the viscosity of the medium so that the fibers can suspend themselves in the medium. Some suspending aids actually are surfactants which function by reducing the surface attraction between the fibers. Unfortunately, however, none of the available suspending aids are entirely satisfactory for large volume manufacture of useful, uniform glass fiber mats.

For example, such polymeric suspending aids materials as polyacrylamides, hydroxyethyl cellulose and the like, provide a highly viscous aqueous solutions at high material concentrations, but which is difficult to handle, and particularly, which drains very slowly through the mat forming screen, or foraminous belt. Furthermore, the degree of the suspension formed using such materials is only fair, and suspensions having a fiber consistency of more than 0.005% give poor quality mats. The viscous suspensions also trap air upon agitation near the formation zone to form stable foams which adversely affect the uniformity and strength of the mats. Finally, the polymers are not effective at low concentrations, and so are expensive for use in what should be a low cost process.

A number of surfactant materials also have been tried for dispersing glass fibers in water, for example, the cationic quaternary nitrogen surfactants, described in Ger. DT No. 2454-354/Fr. Demande No. 2,250,719 (June, 1975). With these surfactants, the glass fiber filaments are drawn from an extruder nozzle, coated with the cationic surfactant, and moistened before chopping into short-length fibers. The chopped fibers then are compounded in another aqueous soluton of a cationic surfactant. Accordingly, in this process, the cationic surfactants must be applied in two separate stages, in acid solution, to form the aqueous fiber dispersion. However, the quality of the dispersions using the materials of this patent application is poor, and substantial amounts of unwanted foams are generated even at low surfactant concentrations during mat production. These results are attributable to the fact that the cationic ammonium compounds used contain only one long chain radical.

Therefore, it is apparent that for a glass fiber dispersion technique to be effective, it is necessary that the dispersions meet several rigid criteria simultaneously which can provide means for making the desired high quality, uniform glass fiber mats at a rapid rate of production in an economically acceptable process. Such criteria are listed below:

1. The dispersing surfactant should provide a uniform dispersion of glass fibers in water effectively at low surfactant concentrations in a single step.

2. The dispersions should be efficient at high glass fiber consistencies so that the mats may be formed without having to expend an unnecessarily large amount of energy to separate and handle large quantities of water.

3. The dispersion compositions preferably should not be accompanied by a substantial increase in the viscosity of the medium, which would neccesitate extensive pumping equipment at the screen to separate the fibers from the water, and which would make drying of the wet mat difficult.

4. The dispersion compositions should be capable of producing glass fiber mats which have a uniform distribution of fibers characterized by a multidirectional array of fibers. The finished mat product should possess uniform high-strength properties, particularly good tensile strength.

5. The dispersions should be capable of use in the wet-laid process in conventional equipment, at high rates of mat production, without generation of unwanted foams which detrimentally affect the mat production process.

6. The dispersion should function in neutral or slightly alkaline so as not to corrode the plant machinery.

7. The surfactant materials preferably should be readily available, at low cost, and be capable of use either by direct addition to the fibers in water, or by precoating the fibers with the surfactant before admixing with water to form the aqueous dispersion composition.

These and other objects and features of the invention will be made apparent from the following more particular description of the invention.

SUMMARY OF THE INVENTION

In accordance with the present invention, there is provided herein improved glass fiber dispersions for making uniform glass fiber mats by the wet-laid process. The well dispersed glass fiber compositions of this invention usually are prepared by mixing chopped glass fibers in water with a small amount of a cationic quaternary ammonium surfactant which has at least two long chain carbon groups in the molecule. As a feature of the invention, the dispersions of this invention may be formed without foaming at relatively high glass fiber consistencies in neutral or slightly alkaline solution. The resultant dispersions then are used to make very high quality glass fiber mats at high rates of production.

DETAILED DESCRIPTION OF THE INVENTION

Description of the Preferred Embodiments

The select quaternary ammonium surfactants of the invention are characterized by the following structural formula:

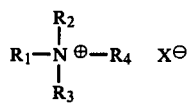

where at least two of $R_1$, $R_2$, $R_3$ and $R_4$ are hydrocarbon groups containing at least 10 carbon atoms each, and preferably between 12 and 18 carbon atoms each. The hydrocarbon groups can be aliphatic or aromatic, and, if aliphatic, can be linear, branched or cyclic in nature, and can be the same or different in each radical. The aliphatic hydrocarbon radical can contain ethylenic unsaturation. Preferably, the remaining two of the $R_1$, $R_2$, $R_3$ and $R_4$ groups are selected from among alkyl groups, such as lower alkyl or hydroxyalkyl groups having from 1-4 carbon atoms, and substituted alkyl groups thereof. The long chain hydrocarbon groups suitably are selected from such long chain hydrocarbon groups such as stearyl, laurel, oleyl, tridecyl, tetradecyl, hexadecyl, dodecyl, octadecyl, nonadecyl, or substituted groups thereof, derived from natural or synthetic sources. The sum of the $R_1$, $R_2$, $R_3$, and $R_4$ groups preferably is at least 22 and less than 48 carbon atoms, and they may be discrete radicals or, alternatively, they may be internally bound to provide an acyclic structure. $X^\ominus$ is an anion, preferably a halogen, i.e., chloride, bromide, iodide, fluoride, or a mono lower alkyl sulfate, acetate or formate.

Typical quaternary ammonium compounds of the invention are distearyl dimethylammonium chloride, and ethylheptadecylamidoethyl stearyl imidazolinium ethylulfate. Other compounds within the scope of the invention are given in *Cationic Surfactants*, Vol. 4, by E. Jungerman, M. Dekker, Inc. (New York, N.Y.) 1970.

In a typical wet-laid process for making glass fiber mats, a stock suspension of the fibrous material of predetermined fiber consistency is prepared in a mixing tank. The suspension then is pumped into a head box of a paper-making machine where it may be further diluted with water to a lower consistency. The diluted suspension then is distributed over a moving foraminous belt under suction to form a nonwoven fiber structure or wet mat on the belt. This wet mat structure may be dired, if necessary, then treated with a binder, and, finally, thoroughly dried to give a finished nonwoven mat product.

In the process of the present invention for the production of glass fiber mats, the glass fiber filaments or strands generally are chopped into bundles of fibers about ¼" to 3" in length, usually about ½" to 2", and preferably about 1" long, and usually about 3 to 20 microns in diameter, and, preferably about 15 microns. In one embodiment, the fibers are added to water containing the selected quaternary amine surfactant compounds of the invention to form a well-dispersed composition. Suitably, the surfactant compound is present at a concentration of about 5–500 ppm of the solution, preferably about 20-200, and most preferably about 50-100 ppm. Alternatively, the chopped glass fibers may be coated initially by spraying or otherwise applying the surfactant thereon, and then dispersing the coated fibers in the aqueous medium. Suitably, the coated fibers contain about 0.01 to 1% by weight of the amine oxide, and, preferably, between 0.025 to 0.25%.

As a feature of the invention, the glass fibers may be dispersed in the select quaternary ammonium surfactants in a single step at relatively high fiber consistencies while still retaining the effective dispersion characteristics of the composition. For example, a fiber consistency of from about 0.001% to about 3.0% may be used, and, preferably, about 0.05% to about 1% is employed, based upon the weight of the fibers in the water. Such compositions furnish excellent dispersions when agitated in conventional mixing equipment. As mentioned, if desired, the highly concentrated fiber dispersion compositions may be diluted at the head box, usually to a consistency of about 0.1% to about 0.3%, and, preferably about 0.2%, which, however, is still a highly concentrated fiber dispersion by conventional standards.

The dispersion compositions of the invention are formed without any substantial change in the viscosity of the medium, or of generation of unwanted foams during the process. Furthermore, the dispersions preferably are prepared at a neutral pH condition, or even perhaps under slightly alkaline conditions, again, without affecting the good quality of the dispersions, or of the finished glass mat products produced therefrom.

The dispersion compositions of the invention produce glass fiber mats which have a high density of fibers therein which are uniformly distributed throughout the mat in a multidirectional array. The finished mats show excellent tensile strength properties, too. The rate of production of the mats is very rapid, indeed, in this invention. In fact, a rate of mat production of over 500 linear ft./min. using conventional paper-making equipment is readily achievable in this process.

The examples which follow will further illustrate the invention, but are not to be considered as being limiting of the principles or practice of the invention.

In Example 1, which includes Tables I and II below, is a compilation of experimental data to compare the dispersing abilities of the cationic quaternary ammonium surfactants of the invention with other related and well-known surfactant materials of the prior art. In Table I, compounds 1-5, Group A, illustrate some of these select compounds of the invention. Compounds 6-14, Group B, illustrate related quaternary ammonium compounds, which are inferior to those of Group A. Compounds 15-18, Group C, are polyethoxylated amine compounds, which are presented for comparison purposes.

For these quality rating tests, the surfactant compounds were dissolved in water at various concentrations, ranging from 100 ppm (0.01%) to 5 ppm (0.0005%) by weight of the surfactant in water. To 100 ml of the surfactant solution was added 1 g of chopped E-glass fiber strands (a 1% fiber consistency), which were 1½" in length and 15 microns in diameter. The mixture then was agitated for 5 minutes.

The quality of a given dispersion was rated on a scale of 1 to 5; a rating of 1 was given to the poorest suspension where the fiber strands agglomerated and/or did not open up as individual fibers. The control was a surfactant free system which was rated as 1. The highest quality dispersions were rated as 5 in which substantially all the fibers were separated from each other. Intermediate ratings of 4, 3 or 2 indicated a gradual trend towards balling-up of fibers.

Foam was measured by dropping 500 ml of the solution from a dropping funnel into a 1 l. measuring cylinder from a height of 28". The amount of foam was the distance between the foam-solution meniscus and the top of the foam in the cylinder and was expressed in ml after waiting for 5 mins. after the drop. Generally a foam of 0 ml at the end of 5 mins. would give a decent mat formation. Foams over 30 ml disrupted the formation of the mat in the mat-making machine.

EXAMPLE 1

Example 1

TABLE I

Group A - Quaternary Ammonium Compounds of the Invention

| Compound No. | Trade Name | Source | Chemical Name | Chemical Structure |
|---|---|---|---|---|
| 1 | Arquad 2HT-75 (75% active) | Armak | di(hydrogenated tallow alkyl)dimethyl ammonium chloride | $(R_{HT})_2N^+(CH_3)_2\ Cl^-$ Where $R_{HT}$ = 24% Hexadecyl, 75% octadecyl and 1% octadecenyl |
| 2 | Arquad 2S-75 (75% active) | Armak | di(soya alkyl amine) dimethyl ammonium chloride | $(R_S)_2N^+(CH_3)_2\ Cl^-$ Where $R_S$ = 24% Hexadecyl, 4% octadecyl, 30% octadecenyl and 42% octadecadienyl |
| 3 | Barisoff 475 (75% active) | Ashland Chem. Co. | Methyl (1) tallowacyl-amidoethyl (2) tallowalkyl-imidazolinium methosulfate | $R_T-C(=N-CH_2-CH_2-N^+(CH_3)(CH_2CH_2NHCOR_T))\ CH_3OSO_3^-$ Where $R_TC-$ is the acyl residue of tallow. |
| 4 | None | Synthesis | Ethyl (1) heptadecylamido-ethyl (2) stearoylimidazolinium ethosulfate | $C_{17}H_{35}-C(=N-CH_2-CH_2-N^+(C_2H_5)(CH_2CH_2NHCOC_{17}H_{35}))\ C_2H_5OSO^-$ |
| 5 | Arquad 2C-75 (75% active) | Armak | di(cocoalkyl)dimethyl ammonium chloride | $(R_C)_2N^+(CH_3)_2\ Cl^-$ Where $R_C$ = 8% octyl, 9% decyl, 47% dodecyl, 18% tetradecyl, 8% hexadecyl and 10% octadecyl. |

Group B - Quaternary Ammonium Surfactants Related to Group A

| Compound No. | Trade Name | Source | Chemical Name | Chemical Structure |
|---|---|---|---|---|
| 6 | Aliquat 336 (88% active) | General Mills | dialkyl dimethyl ammonium chloride | $(R)_2N^+(CH_3)_2\ Cl^-$ Where R is a mixture of $C_8$ and $C_{10}$ carbon chains, with $C_8$ predominating. |
| 7 | Arquad 18-50 (50% active) | Armak | Trimethyl stearyl ammonium chloride | $C_{18}H_{37}N^+(CH_3)_3\ Cl^-$ |
| 8 | Arquad T-50 (50% active) | Armak | Trimethyl tallowalkyl ammonium chloride | $R_TN^+(CH_3)_3\ Cl^-$ Where $R_T$ = 3% tetradecyl, 27% hexadecyl, 16% octadecyl, 48% octadecenyl, and 6% octadecadienyl. |

Example 1-continued

TABLE I

| | | | | | |
|---|---|---|---|---|---|
| 9 | Arquad 16-50 (50% active) | Armak | Trimethyl hexadecyl ammonium chloride | $C_{16}H_{33}\overset{\underset{\mid}{CH_3}}{\underset{\underset{\mid}{CH_3}}{N^+}}-CH_3 \quad Cl^-$ | |
| 10 | Arquad 12-33 (33% active) | Armak | Trimethyl dodecyl ammonium chloride | $C_{12}H_{25}\overset{\underset{\mid}{CH_3}}{\underset{\underset{\mid}{CH_3}}{N^+}}-CH_3 \quad Cl^-$ | |
| 11 | Arquad C-50 (50% active) | Armak | Trimethyl cocoalkyl-ammonium chloride | $R_C\overset{\underset{\mid}{CH_3}}{\underset{\underset{\mid}{CH_3}}{N^+}}-CH_3 \quad Cl^-$ | Where $R_C$ = same as in Compound No. 5 |
| 12 | Ethoquad T-12 (100% active) | Armak | Methyl diethoxy tallow ammonium chloride | $R_T\overset{\underset{\mid}{CH_2CH_2OH}}{\underset{\underset{\mid}{CH_2CH_2OH}}{N^+}}-CH_3 \quad Cl^-$ | Where $R_T$ = same as in Compound No. 7 |
| 13 | Ethoquad C-25 (100% active) | Armak | Methylpoly (15) ethoxylated coco ammonium chloride | $R_CN^+(CH_2-CH_2O)_X / \backslash (CH_2-CH_2O)_Y -CH_3 \quad Cl^-$ | Where X & Y = 15 and $R_C$ = same as in Compound No. 5 |
| 14 | Gaftex CDL (50% active) | GAF | Trimethylbenzyl-ammonium chloride | $C_6H_5CH_2-\overset{\underset{\mid}{CH_3}}{\underset{\underset{\mid}{CH_3}}{N^+}}-CH_3 \quad Cl^-$ | |

Group C - Polyethoxylated Amines

| Compound No. | Trade Name | Source | Chemical Name | Chemical Structure | |
|---|---|---|---|---|---|
| 15 | Armak T | Armak | Tallowalkylammonium acetate | $R_TNH_3{}^+OOCCH_3{}^-$ | Where $R_T$ = same as in Compound No. 8 |
| 16 | Ethomeen C25 | Armak | Poly (15) ethoxylated cocoamine | $R_CN{\Big\langle}^{(CH_2CH_2O)_XH}_{(CH_2CH_2O)_YH}$ | Where $R_C$ = same as Compound No. 5 and X & Y = 15 |
| 17 | Ethomeen T12 | Armak | Diethoxy tallowalkyl amine | $R_TN{\Big\langle}^{CH_2CH_2OH}_{CH_2CH_2OH}$ | Where $R_T$ = same as in Compound No. 8 |
| 18 | Ethomeen T25 | Armak | Poly (15) ethoxylated tallow alkyl amine | $R_TN{\Big\langle}^{(CH_2-CH_2O)_XH}_{(CH_2-CH_2O)_YH}$ | Where $R_T$ = same as in Compound No. 8, and X & Y = 15 |

TABLE II

Quality Ratings of Glass Fiber Dispersions and Foaming Characteristics
Surfactant Compounds of Table I at Various Concentrations

| | Quality (and Foam) Ratings | | | |
|---|---|---|---|---|
| | Concentration | | | |
| Surfactant | 500 ppm (Foam) | 100 ppm (Foam) | 50 ppm (Foam) | 20 ppm (Foam) |
| Control - No Surfactant | 1 | 1 | 1 | 1 |
| Group A Compound No. | | | | |
| 1 | 5 | 4 (20) | 4 | 3+ (0) |
| 2 | 5 | 4 (20) | 4 | 3 (0) |
| 3 | 4 (0) | 4 | 3 | 2 |
| 4 | 4 (0) | 4 | 3 | 2 |
| 5 | 5 | 4 (60) | 3 | 3 (20) |
| Group B Compound No. | | | | |
| 6 | 3 (>150) | 2 | 2 | 1 |
| 7 | 3– (>200) | 2 (190) | 2 | 1,2 |
| 8 | 3– (>200) | 2 (200) | 2 | 1,2 |
| 9 | 3– (>200) | 2 (180) | 2 | 1,2 |
| 10 | 3– (>200) | 2 (200) | 1,2 | 1 |
| 11 | 2 | 2 | 1,2 | 1 |
| 12 | 3– (110) | 2 | 2 | 1 |
| 13 | 2 | 2 | 1 | |
| 14 | 1 | 1 | 1 | 1 |
| Group C Compound No. | | | | |
| 15 | 3 (100) | 2 | 1 | 1 |
| 16 | 2 | 2 | 1 | 1 |
| 17 | 2 | 2 | 1 | 1 |
| 18 | 2 | 2 | 1 | 1 |

From the data in Tables I and II, it is evident that the select quaternary ammonium surfactant compounds 1–5 of the invention (Group A) are outstandingly superior to the other surfactants in their ability to form uniform dispersion glass fiber compositions in water without generation of foams. The related cationic surfactants (Group B), for example, are poorer dispersing agents for glass fibers, particularly at low concentrations. Similarly, the other surfactants (Group C) also form very poor fiber dispersions, irrespective of their concentration. In summary, only the surfactants of Group A exhibit high quality dispersion ratings and as will be shown later, they form the desired high quality glass fiber mats in the wet-laid process suitable for use in the building material industry.

These results are based upon the observation that a suspension quality of rating 3 or better in a single dispersing step will produce an acceptable mat provided the foam generation by the surfactant at the required concentration is not too high. High foam disrupts the "formation" by mechanically interfering with the process, and, in addition, it is also a nuisance in the plant. Thus, if a surfactant gives a good dispersion only at a very high concentration, it may be useless if it generates copious amounts of foam at such high concentration. Compounds 6, 7, 8, 9, 10, 12 and 15, for example, offer a reasonable suspension at 500 ppm concentration, however, at this concentration they also generate high foam. At the lower concentrations, on the other hand, they do not provide acceptable suspensions. Compounds 11 and 13 through 18 do not offer a good suspension even at as high as 500 ppm concentration.

EXAMPLE 2

COATING OF GLASS FIBERS WITH SURFACTANT PRIOR TO FORMING DISPERSIONS AND QUALITY RATINGS THEREOF

In these tests, weighed chopped E-glass (1½" in length, 15 microns in diameter) were coated with surfactant by stirring the fibers into solutions of representative surfactant compounds of Table I at concentrations of 2%, 0.4% and 0.2% by weight of the surfactant. The solutions then were filtered and reweighed. The increase in weight of the fibers was attributed to the surfactant coating thereon. The fibers treated with 2%, 0.4% and 0.2% surfactant solutions, respectively, thus contained 0.70%, 0.14% and 0.07% surfactant material based on the initial weight of the fibers. The thus-coated chopped glass fibers then were added to water (1 g/100 ml) with stirring and the quality ratings of the dispersion obtained and compared as before.

Table III

| Surfactant Compound No. | Quality Ratings at Various Surfactant Content Based Upon Weight of Fibers | | |
|---|---|---|---|
| | 0.70% | 0.14% | 0.07% |
| 1 | 4 | 4 | 3+ |
| 2 | 4 | 4 | 3+ |
| 13 | 1,2 | 1 | 1 |
| 14 | 2 | 1 | 1 |

The data in Table III shows that the representative surfactant compounds 1 and 2 of the invention provide outstanding dispersion compositions when applied also as a pre-coat to the fibers, and that this result is achieved even with only small amounts of the surfactant on the surface of the fibers. The other surfactant materials, however, give very poor results even at high concentrations when used as a pre-treatment alone with glass fibers.

EXAMPLE 3

FORMATION OF GLASS FIBER MATS BY WET-LAID PROCESS WITH DISPERSIONS USING THE SURFACTANT COMPOUNDS OF THE INVENTION

To 7 liters of a 200 ppm solution of surfactant compound 1 was added 7 g of chopped E-glass (1½" long, 15 microns diameter) with stirring to form the usual good dispersion. The dispersion then was carried through the laboratory Williams paper-making apparatus to form a 10"×11" mat product. The glass fibers in this mat were very evenly distributed throughout. After formation, the mat was treated carefully with urea-formaldehyde resin and cured in the usual manner. The finished mat product had a 85% fiber content and contained 15% resin. The fiber density was about 2 lbs/100 sq. ft. of mat area.

EXAMPLE 4

The procedure of Example 3 was repeated with compound 1 using 3.5 g of glass fibers. The resultant mat had a density of 1 lb/100 sq. ft. of mat area, and exhibited a uniform distribution and a multidirectional array of fibers therein.

EXAMPLE 5

Example 4 was repeated using 14 g of glass fibers in place of 7 g of fibers. The mat formed had a density of about 4 lbs/100 sq. ft. and again was of excellent quality.

COMPARATIVE EXAMPLES WITH OTHER SURFACTANTS

EXAMPLE 6

Example 4 was repeated using the surfactant of compound 6 in place of that of compound 1. The mat was of unacceptable quality with considerable clumping of fibers at different areas. The process also was hampered by excessive foam formation.

EXAMPLE 7

Example 4 was repeated using surfactant compound 7 at a 200 ppm concentration. The quality of the mat was still unacceptable with areas of considerable fiber clumping and relatively poor fiber concentration. Considerable foam also was observed which affected the quality of the mat.

EXAMPLE 8

Example 4 was repeated using the surfactant of compound 10 at 50 ppm in place of the surfactant of Example 7. The mat again was of unacceptable quality.

PILOT PLANT PRODUCTION RUNS

EXAMPLE 9

In the following example, a conventional pilot production unit was employed. A 0.5% glass fiber dispersion was prepared in a mixing tank using 200 ppm solution of surfactant compound 1. This dispersion was pumped into the headbox of the pilot machine and simultaneously diluted with fresh 20 ppm solution of surfactant compound 1 in water to give a final glass consistency in the headbox of 0.14%. This diluted dispersion then was distributed onto a moving foraminous belt at a rate such that a mat of 2 lbs. fiber/100 sq. ft. was obtained. The mat so formed was of excellent quality insofar as uniformity of fiber distribution and fiber array was concerned. No foaming was encountered in the machine at the concentration of the surfactant used in the process.

EXAMPLE 10

This experiment was run using 300 ppm hardness water, 10 ppm surfactant compound 1 and enough E-glass fiber (¼" to 1¼" long) to give an approximately 2 lbs./100 sq. ft. mat. The rate of production was over 500 linear ft./min. The mat then was treated with urea-formaldehyde binder (15% based on weight of the mat), and cured to give a finished mat product of excellent physical properties and fiber distribution.

EXAMPLE 11

Rolled carbon steel vessels (approximately 15 g each) were weighed and submerged in 225 ml of tap water (50 ppm as $CaCO_3$ hardness) alone, and in tap water containing 500 or 200 ppm of surfactant compound 1. After 120 hours at room temperature, the vessels were removed, washed and reweighed. The solutions also were analyzed for iron content. The results of the experiments are shown in Table V.

Table V

| Solution | % wt. loss of vessel after 120 hrs. | Iron in solution after 120 hrs. (in ppm) |
|---|---|---|
| (a) Water alone | 0.17 | 80 |
| (b) Water containing surfactant Compound 1 at: | | |
| 500 ppm | 0.12 | 44 |
| 200 ppm | 0.13 | 53 |

The results demonstrate that the surfactants of the invention do not corrode the steel machinery used in mat formation.

While the invention has been described with reference to certain embodiments thereof, it will be understood by those skilled in the art that certain changes and modifications may be made which are within the skill of the art. Accordingly, it is expected to be limited by the appended claims only, in which:

What is claimed is:

1. In the manufacture of uniform glass mats at a high rate of production by the wet-laid process, the improved method which comprises
   forming an aqueous dispersion of glass fibers by mixing bundles of said fibers of about ¼ to 3 inches in length in an aqueous medium at a fiber consistency of about 0.001 to 3.0% with about 5–500 ppm of a cationic quaternary ammonium surfactant compound having the formula:

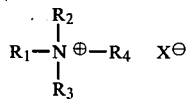

where $R_1$, $R_2$, $R_3$ and $R_4$ are selected from the group consisting of aliphatic and aromatic hydrocarbon radicals, straight chain or branched, or two or more form a cyclic group, saturated or unsaturated, substituted or unsubstituted, at least two of said radicals containing at least 10 carbon atoms each, being the same or different, the sum of the carbon atoms in $R_1$, $R_2$, $R_3$ and $R_4$ being at least 22 and less than about 48, and X is an anion thereby to substantially disperse said bundles into individual fibers within the aqueous medium, and,
   passing said dispersion through a mat-forming screen to form the desired uniform glass fiber mat.

2. A method according to claim 1 wherein said two radicals contain between 12 and 18 carbon atoms each.

3. A method according to claim 1 wherein $R_1$, $R_2$, $R_3$ and $R_4$ radicals are aliphatic radicals.

4. A method according to claim 2 wherein at least two of said radicals form a cyclic ring.

5. A method according to claim 1 wherein said anion is selected from the group consisting of halogen, alkyl sulfate, acetate and formate anion.

6. A method according to claim 1 wherein two of said radicals are lower alkyl.

7. A method according to claim 1 wherein said glass fibers are diluted from a more concentrated consistency to a lower consistency before being passed through said mat-forming screen.

8. A method according to claim 1 wherein said amount of cationic quaternary ammonium compound is about 20–200 ppm, and said fiber consistency is about 0.05 to about 1%.

9. A method according to claim 1 wherein said compound is di(hydrogenated tallow alkyl) dimethyl ammonium chloride.

10. A method according to claim 1 wherein said compound is di(soya alkylamine) dimethyl ammonium chloride.

11. A method according to claim 1 wherein said compound is methyl (1) tallowacylamidoethyl (2) tallowalkylimidazolinium methosulfate.

12. A method according to claim 1 wherein said compound is ethyl (1) heptadecylamidoethyl (2) steareylimidazolinium ethosulfate.

13. A method according to claim 1 wherein said compound is di(cocoalkyl) dimethyl ammonium chloride.

14. A method according to claim 1 wherein said fibers are about ½ to 2 inches in length and about 3 to about 20 microns in diameter.

15. A method according to claim 1 which further comprises:
   precoating said glass fibers with said compound having the formula of claim 1 prior to forming said aqueous dispersion.

16. A method according to claim 15 wherein said fibers contain about 0.01 to 1% by weight of the surfactant.

17. A method according to claim 16 wherein the fibers are coated with between 0.025 to 0.25% of the compound.

18. A method to claim 1 further including the steps of:
   drying and curing said mat with a binder to form a finished mat product of high quality.

19. A method according to claim 1 in which said fibers are about 1 inch in length.

20. A method according to claim 1 in which said fibers are about 15 microns in diameter.

* * * * *